US011015958B2

(12) United States Patent
Kakimi

(10) Patent No.: US 11,015,958 B2
(45) Date of Patent: May 25, 2021

(54) INITIALIZATION METHOD AND INITIALIZATION DEVICE

(71) Applicant: KABUSHIKI KAISHA TOKAI RIKA DENKI SEISAKUSHO, Aichi (JP)

(72) Inventor: Muneyoshi Kakimi, Aichi (JP)

(73) Assignee: KABUSHIKI KAISHA TOKAI RIKA DENKI SEISAKUSHO

( * ) Notice: Subject to any disclaimer, the term of this patent is extended or adjusted under 35 U.S.C. 154(b) by 20 days.

(21) Appl. No.: 16/440,520

(22) Filed: Jun. 13, 2019

(65) Prior Publication Data

US 2019/0390980 A1    Dec. 26, 2019

(30) Foreign Application Priority Data

Jun. 20, 2018    (JP) .............................. JP2018-117394

(51) Int. Cl.
*G01D 5/12*      (2006.01)
*G01B 7/00*      (2006.01)
*G01D 5/16*      (2006.01)

(52) U.S. Cl.
CPC ..................................... *G01D 5/16* (2013.01)

(58) Field of Classification Search
CPC .......... G01D 5/145; G01D 5/12; G01D 5/142; G01D 5/16; G01B 7/30; G01B 7/003; G01R 33/07
See application file for complete search history.

(56) References Cited

U.S. PATENT DOCUMENTS

2005/0171727 A1*   8/2005   Sakabe ................... G01D 5/04
                                                              702/151
2007/0205762 A1    9/2007   Nakata et al.

FOREIGN PATENT DOCUMENTS

EP          1783036 A2     5/2007
JP       2010236935 A     10/2010
JP       2012088116 A      5/2012

* cited by examiner

*Primary Examiner* — Tung X Nguyen
*Assistant Examiner* — Feba Pothen
(74) *Attorney, Agent, or Firm* — Tarolli, Sundheim, Covell & Tummino LLP

(57) ABSTRACT

A rotation angle detection device includes a driving gear rotated integrally with a rotary body, a first driven gear and a second driven gear coupled to the driving gear and rotated in cooperation with the driving gear, a first sensor that detects rotation of the first driven gear and generates a first sensor output, and a second sensor that detects rotation of the second driven gear and generates a second sensor output. An initialization method includes adjusting zero points of the first and second sensor output obtained at positions of rotation references of the first and second driven gears, measuring a deviation amount occurring in a calculation of rotation information of at least one of the first and second driven gears, and correcting the zero point of at least one of the first and second sensor outputs based on the measured deviation amount.

5 Claims, 3 Drawing Sheets

INITIALIZATION METHOD AND INITIALIZATION DEVICE

RELATED APPLICATIONS

The present invention is a Nonprovisional Patent Application under 35 USC 111(a), claiming priority to JP 2018-117394, filed on 20 Jun. 2018, the entirety of which is incorporated herein by reference.

BACKGROUND

1. Field

The following description relates to an initialization method and an initialization device for initializing rotation angle detection of a rotary body.

2. Description of Related Art

A typical rotation angle detection method is an absolute angle measurement method, which calculates an absolute value of a rotation angle of a detection subject. A rotation angle detection device that uses the absolute angle measurement method is described in Japanese Laid-Open Patent Publication No. 2010-236935. The rotation angle detection device includes a driving gear and two driven gears. The driving gear is rotated integrally with a rotary body, which is the detection subject, and the two driven gears are rotated in cooperation with the driving gear. The driven gears differ from each other in the number of teeth. Thus, when the driving gear rotates, the driven gears are rotated by different angles. The two driven gears each include a detector (sensor or the like) to detect and output the rotation angle of the corresponding driven gear. Then, an absolute rotation angle of the rotary body is calculated based on the detected rotation angles.

SUMMARY

In the structure including the driving gear and the two driven gears, the detected rotation angles of the driven gears may include an error due to variations in the gear dimensions, variations in coupling position, backlash between the gears, or the like. Thus, the error may change the absolute rotation angle of the rotary body calculated from the rotation angles. This may lower the detection accuracy of the rotation angle.

One object of the following description is to provide an initialization method and an initialization device that allow for rotation angle detection with high accuracy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an initialization method for a rotation angle detection device is provided. The rotation angle detection device includes a driving gear rotated integrally with a rotary body, a first driven gear and a second driven gear coupled to the driving gear and rotated in cooperation with the driving gear, a first sensor that detects rotation of the first driven gear and generates a first sensor output, and a second sensor that detects rotation of the second driven gear and generates a second sensor output. The rotation angle detection device calculates a rotation angle of the rotary body based on the first sensor output and the second sensor output. The initialization method includes adjusting a zero point of the first sensor output so that a rotation reference of the first driven gear coincides with a reference of the first sensor output, adjusting a zero point of the second sensor output so that a rotation reference of the second driven gear coincides with a reference of the second sensor output, calculating rotation information of at least one of the first driven gear and the second driven gear based on the first sensor output and the second sensor output, measuring a deviation amount occurring in the calculation of the rotation information, and correcting the zero point of at least one of the first sensor output and the second sensor output to offset the deviation amount so that the deviation amount is included in a specified range.

This configuration corrects the zero point of each sensor to a preferred value based on the deviation amount of the rotation information. Accordingly, even if the first driven gear and the second driven gear have dimensional variations or coupling variations, the zero point of the output of each sensor is corrected. Thus, the rotation angle detection device allows for the detection of the rotation angle of the rotary body with higher accuracy.

In the initialization method for the rotation angle detection device, the rotation angle detection device may calculate the rotation information based on the first sensor output and the second sensor output and calculate the rotation angle of the rotary body based on the rotation information and at least one of the first sensor output and the second sensor output.

With this configuration, the rotation information is a preferred value obtained from the output of each sensor of which the zero point is corrected. Accordingly, the rotation angle detection device allows for the calculation of the rotation angle of the rotary body from the preferred value of the rotation information. Thus, the rotation angle detection device allows for the detection of the rotation angle of the rotary body with even higher accuracy.

In the initialization method for the rotation angle detection device, the adjusting a zero point of the first sensor output may include setting a deviation of the rotation reference of the first driven gear from the reference of the first sensor output as a first zero point correction value and adjusting the zero point of the first sensor output based on the first zero point correction value. The adjusting a zero point of the second sensor output may include setting a deviation of the rotation reference of the second driven gear from the reference of the second sensor output as a second zero point correction value and adjusting the zero point of the second sensor output based on the second zero point correction value. The correcting the zero point may include calculating an offset amount to include the deviation amount in the specified range when the rotation angle of the rotary body is calculated based on the first sensor output and the rotation information of the first sensor and calculating a new zero point correction value by correcting the second zero point correction value based on the offset amount.

This configuration corrects the second zero point correction value that is not directly related to the calculation of the rotation angle of the rotary body and corrects the deviation of the first sensor output. Thus, the rotation angle detection device allows for the detection of the rotation angle of the rotary body with even higher accuracy.

In the initialization method for the rotation angle detection device, the rotation information may be a value obtained by rounding a fraction. The correcting the zero point may include calculating a center deviation amount from an average value of a maximum value and a minimum value of the deviation amount and offsetting the deviation amount so that the center deviation amount is zero or near zero.

With this configuration, the deviation of the rotation information will easily be included in the range of which the center is zero. Accordingly, when the rotation information is obtained by rounding the fraction, which corresponds to the deviation, the rotation information is not likely to be affected by the rounding of the fraction. Thus, the rotation information is not likely to be an erroneous value.

In another general aspect, an initialization device for a rotation angle detection device is provided. The rotation angle detection device includes a driving gear rotated integrally with a rotary body, a first driven gear and a second driven gear coupled to the driving gear and rotated in cooperation with the driving gear, a first sensor that detects rotation of the first driven gear and generates a first sensor output, and a second sensor that detects rotation of the second driven gear and generates a second sensor output. The rotation angle detection device calculates a rotation angle of the rotary body based on the first sensor output and the second sensor output. The initialization device includes a zero point adjustment unit. The zero point adjustment unit adjusts a zero point of the first sensor output so that a rotation reference of the first driven gear coincides with a reference of the first sensor output and adjusts a zero point of the second sensor output so that a rotation reference of the second driven gear coincides with a reference of the second sensor output. The initialization device further includes a correction unit that corrects the zero point of at least one of the first sensor output and the second sensor output. The correction unit calculates rotation information of at least one of the first driven gear and the second driven gear based on the first sensor output and the second sensor output, measures a deviation amount occurring in the calculation of the rotation information, and corrects the zero point of at least one of the first sensor output and the second sensor output to offset the deviation amount so that the deviation amount is included in a specified range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of an initialization method and initialization device will now be described with reference to FIGS. 1 to 6.

Figure 1:
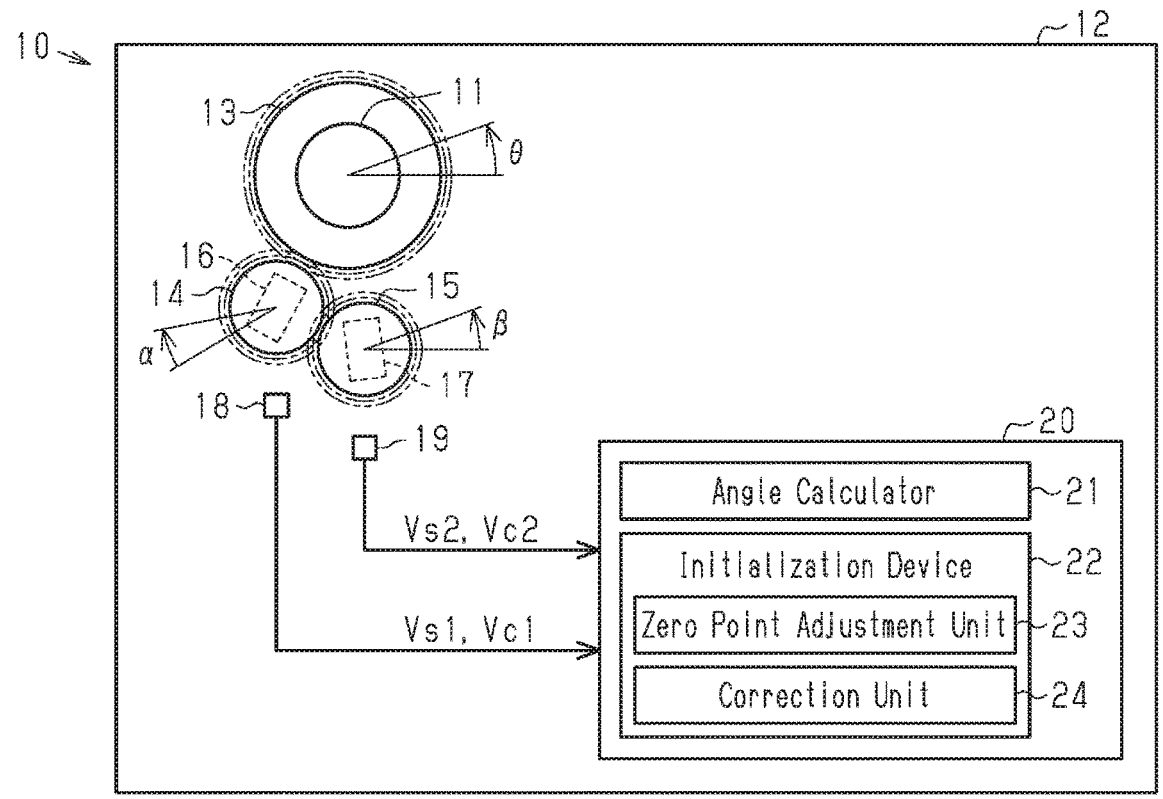
FIG. 1 is a schematic view of a rotation angle detection device.

As illustrated in FIG. 1, a rotation angle detection device 10 is coupled to a steering shaft 11. The steering shaft 11 is coupled to a steering wheel (not illustrated) in an integrally rotatable manner. The steering shaft 11 is one example of a rotary body. The rotation angle detection device 10 includes a box-shaped housing 12. The housing 12 is fixed to a structural body such as a steering column (not illustrated) arranged around the steering shaft 11. The housing 12 accommodates a driving gear 13, a first driven gear 14, and a second driven gear 15. The driving gear 13 is coaxially fitted onto the steering shaft 11 in an integrally rotatable manner. The first driven gear 14 and the second driven gear 15 are rotated in cooperation with the driving gear 13. In the present example, the first driven gear 14 is engaged with the driving gear 13, and the second driven gear 15 is engaged with the first driven gear 14.

The first driven gear 14 and the second driven gear 15 differ from each other in the number of teeth. Accordingly, when the driving gear 13 is rotated in cooperation with the rotation of the steering shaft 11, an absolute rotation angle $\alpha'$ of the first driven gear 14 relative to an absolute rotation angle $\theta$ of the driving gear 13 differs from an absolute rotation angle $\beta'$ of the second driven gear 15 relative to the absolute rotation angle $\theta$ of the driving gear 13. For example, the number of teeth of the driving gear 13 may be represented by z, the number of teeth of the first driven gear 14 may be represented by m, and the number of teeth of the second driven gear 15 may be represented by L. In this case, if m<L<z is satisfied, when the driving gear 13 completes a single rotation, the first driven gear 14 is rotated by z/m of a rotation, and the second driven gear 15 is rotated by z/L of a rotation.

The first driven gear 14 and the second driven gear 15 include a first magnet 16 and a second magnet 17, respectively. The first magnet 16 and the second magnet 17 are permanent magnets. The first magnet 16 and the second magnet 17 are rotated integrally and coaxially with the first driven gear 14 and the second driven gear 15, respectively. The rotation angle detection device 10 includes a first magnetic sensor 18 and a second magnetic sensor 19. The first magnetic sensor 18 serves as a first sensor that detects the magnetic field of the first magnet 16, and the second magnetic sensor 19 serves as a second sensor that detects the magnetic field of the second magnet 17. A magnetoresistive sensor (MR) sensor may be employed as each of the first magnetic sensor 18 and the second magnetic sensor 19. The MR sensor, for example, includes four bridge-connected magnetoresistive elements. The resistance value of each magnetoresistive element varies in accordance with the magnetic field (direction of magnetic flux) of the magnetoresistive element. The first magnetic sensor 18 and the second magnetic sensor 19 each obtain a median potential of the bridge circuit, which is in accordance with a change in the magnetic field (direction of magnetic flux), as a detection signal of a rotation angle of the corresponding driven gear. Then, the first magnetic sensor 18 and the second magnetic sensor 19 each output the detection signal to a microcomputer 20 included in the housing 12.

The first magnetic sensor 18 outputs two analog signals, namely, a first sine wave signal Vs1 and a first cosine wave signal Vc1 based on changes in the direction of the magnetic flux of the first magnet 16 resulting from the rotation of the first driven gear 14. The first sine wave signal Vs1 and the first cosine wave signal Vc1 are examples of a first sensor output. The first sine wave signal Vs1 and the first cosine wave signal Vc1 each complete a single cycle when the first driven gear 14 is rotated over a detection range $\Omega$ of the first magnetic sensor 18. In other words, the first sine wave signal Vs1 and the first cosine wave signal Vc1 each complete a single cycle when the driving gear 13 is rotated by $(m/z)\Omega$. The analog signals continuously change in accordance with a rotation angle $\alpha$ of the first driven gear 14 and obtain waveforms of repetitive cycles. The phase of the first cosine wave signal Vc1 is offset from the first sine wave signal Vs1 by ¼ of one cycle.

The second magnetic sensor 19 outputs two analog signals, namely, a second sine wave signal Vs2 and a second cosine wave signal Vc2 based on changes in the direction of the magnetic flux of the second magnet 17 resulting from the rotation of the second driven gear 15. The second sine wave signal Vs2 and the second cosine wave signal Vc2 are examples of a second sensor output. The second sine wave signal Vs2 and the second cosine wave signal Vc2 each complete a single cycle when the second driven gear 15 is rotated over a detection range $\Omega$ of the second magnetic sensor 19. In other words, the second sine wave signal Vs2 and the second cosine wave signal Vc2 each complete a single cycle when the driving gear 13 is rotated by $(L/z)\Omega$. The analog signals continuously change in accordance with a rotation angle $\beta$ of the second driven gear 15 and obtain waveforms of repetitive cycles. The phase of the second cosine wave signal Vc2 is offset from the second sine wave signal Vs2 by ¼ of one cycle.

The microcomputer 20 of the rotation angle detection device 10 includes an angle calculator 21. The angle calculator 21 calculates the absolute rotation angle $\theta$ of the driving gear 13 (steering shaft 11) based on the output of the first magnetic sensor 18 and the second magnetic sensor 19. The microcomputer 20 stores a program for the calculation of the absolute rotation angle $\theta$ of the steering shaft 11. The angle calculator 21 calculates the absolute rotation angle $\theta$ using the program. The absolute rotation angle $\theta$ may be a rotation angle less than 360° or greater than 360°.

When calculating the absolute rotation angle $\theta$ of the steering shaft 11, the angle calculator 21 obtains digital values of the output (analog signals) of the first magnetic sensor 18 and the second magnetic sensor 19 through an A/D converter (not illustrated). Then, the angle calculator 21 calculates the rotation angle $\alpha$ of the first driven gear 14 in the detection range $\Omega$ of the first magnetic sensor 18, and the rotation angle $\beta$ of the second driven gear 15 in the detection range $\Omega$ of the second magnetic sensor 19 based on output value of the A/D converter.

In the present example, the angle calculator 21 calculates the rotation angle $\alpha$ with an inverse tangent function "$\alpha=\tan^{-1}(Vs1/Vc1)$" that is based on the first sine wave signal Vs1 and the first cosine wave signal Vc1. Further, the angle calculator 21 calculates the rotation angle $\beta$ with an inverse tangent function "$\beta=\tan^{-1}(Vs2/Vc2)$" that is based on the second sine wave signal Vs2 and the second cosine wave signal Vc2.

Calculation of Absolute Rotation Angle $\theta$

A process for calculating the absolute rotation angle $\theta$ of the driving gear 13 executed by the angle calculator 21 will now be described.

The relationship of the absolute rotation angle $\theta$ of the driving gear 13 and the absolute rotation angle $\alpha'$ of the first driven gear 14 is expressed with the numbers of teeth z and m in the following equation (1).

$$\theta = m\alpha'/z \tag{1}$$

The absolute rotation angle $\alpha'$ of the first driven gear 14 is expressed in the following equation (2).

$$\alpha' = \alpha + i\Omega \tag{2}$$

Here, $\alpha$ is a rotation angle of the first driven gear 14 in the detection range $\Omega$ of the first magnetic sensor 18. Further, "i" in equation (2) refers to the number of cycles (number of rotation), which serves as rotation information from the first magnetic sensor 18. The cycle number i is the number of occurrences in which the first magnetic sensor 18 performs a detection in a cycle of the detection range $\Omega$. The cycle number i is an integer value (0 cycle, 1 cycle, 2 cycles . . . ).

The following equation (3) is obtained when equation (2) is substituted into equation (1).

$$\theta = m(\alpha + i\Omega)/z \tag{3}$$

The angle calculator 21 obtains the absolute rotation angle $\theta$ of the driving gear 13 based on equation (3). In other words, the absolute rotation angle $\theta$ of the driving gear 13 may be calculated as long as the rotation angle $\alpha$ of the first driven gear 14 and the cycle number i are obtained. In this way, the absolute rotation angle $\theta$ is calculated based on the cycle number i (number of rotation) and the rotation angle $\alpha$ (or $\beta$).

Calculation of Cycle Number i

A method for obtaining the cycle number i with the angle calculator 21 will now be described. Because of the difference in the number of teeth, the absolute rotation angle $\alpha'$ of the first driven gear 14 differs from the absolute rotation angle $\beta'$ of the second driven gear 15 when the driving gear 13 is rotated by $\theta$. The difference between the absolute rotation angle $\alpha'$ and the absolute rotation angle $\beta'$ satisfies the following relationship.

$$\alpha' - \beta' = \theta[z(L-m)/mL]$$

According to the above equation, the absolute rotation angle $\theta$ of the driving gear 13 is expressed in the following equation (4).

$$\theta = \Delta ab \cdot mL/z(L-m) \tag{4}$$

Here, $\Delta ab$ refers to "$\alpha' - \beta'$". Further, $\Delta ab$ is expressed with the rotation angle $\alpha$ and the rotation angle $\beta$ in the following equation.

$$\Delta ab = \alpha - \beta \text{(where } \alpha - \beta \geq 0\text{)}$$

$$\Delta ab = \alpha - \beta + \Omega \text{(where } \alpha - \beta < 0\text{)}$$

From equation (3) and equation (4), the cycle number i is calculated with the following equation (5).

$$i = (\theta ab - \theta a)/(m\Omega/z) \tag{5}$$

Here, $\theta ab$ in equation (5) is calculated from the following equation.

$$\theta ab = \Delta ab \cdot mL/z(L-m)$$

When $\alpha-\beta\geq 0$ is satisfied, $\Delta ab=\alpha-\beta$ is obtained. When $\alpha-\beta<0$ is satisfied, $\Delta ab=\alpha-\beta+\Omega$ is obtained.

Further, $\theta a$ in equation (5) is calculated from the following equation.

$$\theta a = m\alpha/z$$

The angle calculator 21 obtains the cycle number i of the first driven gear 14 from the rotation angle $\alpha$ and the rotation angle $\beta$ based on equation (5). In this way, the cycle number i (number of rotation) is calculated based on the difference $\Delta ab$ and the rotation angle $\alpha$ (or $\beta$).

Zero Point Correction

The microcomputer 20 includes an initialization device 22 that initializes the rotation angle detection device 10. The initialization device 22 includes a zero point adjustment unit 23. The zero point adjustment unit 23 adjusts the zero point of the output of the first and second magnetic sensors 18 and 19 so that rotation references of the first driven gear 14 and the second driven gear 15 coincide with references of the output (analog signal) of the first magnetic sensor 18 and the second magnetic sensor 19. The zero point adjustment unit 23 calculates a first correction value A as a first zero point correction value based on the deviation of the rotation reference of the first driven gear 14 (e.g. 0°) from the output reference of the first magnetic sensor 18. In the present example, the zero point adjustment unit 23 obtains the output of the first magnetic sensor 18 when the first driven gear 14 is located at the rotation reference and sets the deviation of the output as the first correction value A. The first correction value A is, for example, held in a memory (not illustrated) of the microcomputer 20. The angle calculator 21 obtains the rotation angle $\alpha$ from the output of the first magnetic sensor 18, which is corrected based on the first correction value A.

Further, the zero point adjustment unit 23 calculates a second correction value B as a second zero point correction value based on the offset of the rotation reference of the second driven gear 15 (e.g. 0°) from the output reference of the second magnetic sensor 19. That is, the zero point adjustment unit 23 obtains the output of the second magnetic sensor 19 when the second driven gear 15 is located at the rotation reference and sets the deviation of the output as the second correction value B. The second correction value B is, for example, held in a memory (not illustrated) of the microcomputer 20. The angle calculator 21 obtains the rotation angle $\beta$ from the output of the second magnetic sensor 19, which is corrected based on the second correction value B.

Figure 2:
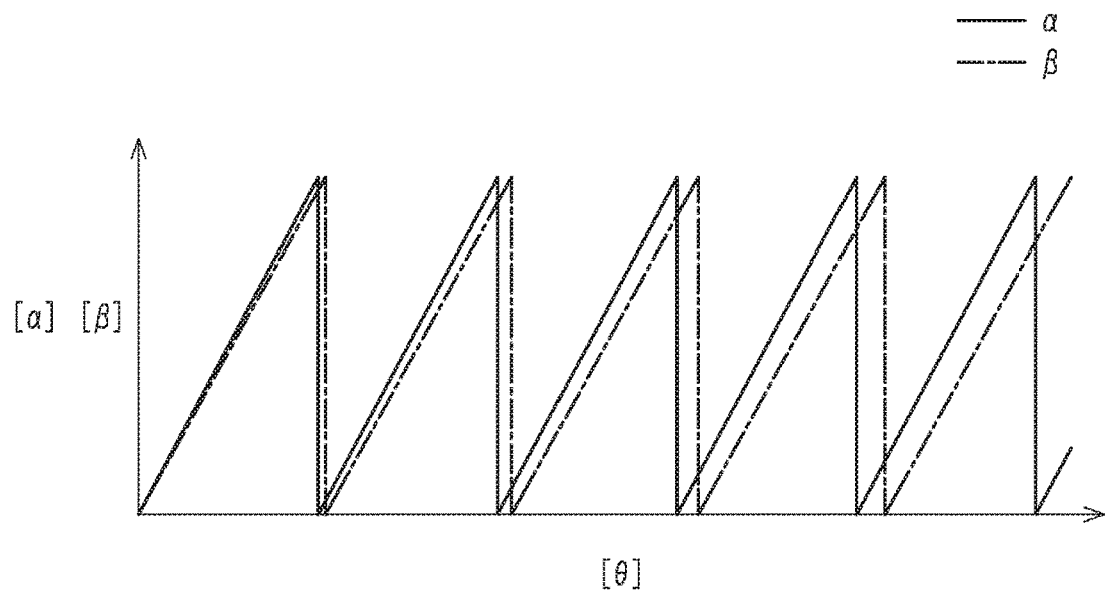
FIG. 2 is a graph illustrating output of a first sensor and a second sensor.

FIG. 2 illustrates waveforms illustrating changes in the rotation angles $\alpha$, $\beta$ calculated after the zero point correction. As illustrated in FIG. 2, the rotation reference of the rotation angle $\alpha$ coincides with the rotation reference of the rotation angle $\beta$ after the zero point correction. When rotation of the driving gear 13 rotates the first driven gear 14 and the second driven gear 15, the first driven gear 14 and the second driven gear 15 are rotated from the rotation reference in the corresponding set cycle.

The rotation angle $\alpha$ and the rotation angle $\beta$ relative to the absolute rotation angle $\theta$ of the driving gear 13 vary in accordance with the difference in the number of teeth between the first driven gear 14 and the second driven gear 15. The rotation angle $\alpha$ and the rotation angle $\beta$ repetitively rise and fall in predetermined cycles in accordance with the corresponding number of teeth. In the present example, the rotation angle $\alpha$ repetitively rises and falls whenever the first driven gear 14 is rotated by the detection range $\Omega$ of the first magnetic sensor 18. In other words, the rotation angle $\alpha$ repetitively rises and falls whenever the driving gear 13 is rotated by $m\Omega/z$. Further, the rotation angle $\beta$ repetitively rises and falls whenever the second driven gear 15 is rotated by the detection range $\Omega$ of the second magnetic sensor 19. In other words, the rotation angle $\beta$ repetitively rises and falls whenever the driving gear 13 is rotated by $L\Omega/z$.

Thus, the difference $\Delta ab$ of the rotation angle $\alpha$ and the rotation angle $\beta$ varies linearly relative to the absolute rotation angle $\theta$ of the driving gear 13 from a value corresponding to the position of the rotation reference when the zero point is adjusted by the zero point adjustment unit 23 (zero in present example). The rotation angle detection device 10 in the present example detects the absolute rotation angle $\theta$ of the driving gear 13 (steering shaft 11) over multiple rotations in clockwise (or counterclockwise) from the position of the rotation reference.

The difference $\Delta ab$ of the rotation angle $\alpha$ and the rotation angle $\beta$ is zero when the absolute rotation angle $\theta$ reaches a predetermined value. The absolute rotation angle $\theta$ reaches a predetermined value when $\Delta ab$, which varies in accordance with the difference of the number of teeth m of the first driven gear 14 and the number of teeth L of the second driven gear 15, reaches the detection range $\Omega$ of the first magnetic sensor 18 and the second magnetic sensor 19. Thus, a calculation range of the absolute rotation angle $\theta$ of the rotation angle detection device 10 is a range from the rotation reference of the absolute rotation angle $\theta$ when the zero point is adjusted (0° in the present example) to a predetermined value at which the difference $\Delta ab$ of the rotation angle $\alpha$ and the rotation angle $\beta$ returns to zero.

Error and Deviation

Figure 3:
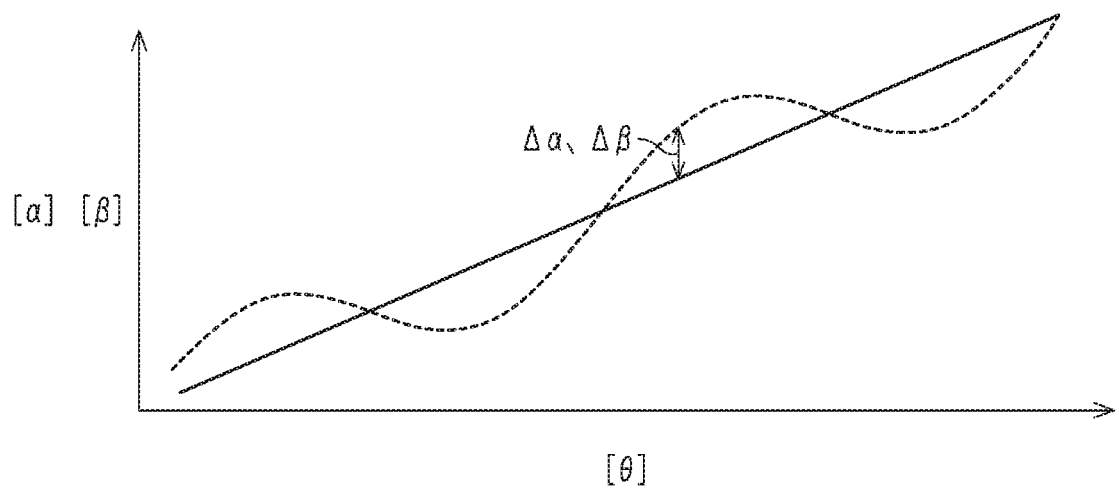
FIG. 3 is a graph illustrating an error in the output of the first sensor and the second sensor.

As illustrated by the broken line in FIG. 3, the output of the first magnetic sensor 18 and the second magnetic sensor 19 may include an error. This results, for example, from gear dimension variations, coupling position variations, backlash between the gears, and the like. Accordingly, the rotation angle $\alpha$ and the rotation angle $\beta$ include an error toward the positive side or negative side from the logical value that linearly varies relative to the absolute rotation angle $\theta$ of the driving gear 13 (solid line in FIG. 3). The degree of an error and the positive or negative direction of an error vary irregularly in accordance with changes in the absolute rotation angle $\theta$ of the driving gear 13.

An error in the rotation angle $\alpha$ and the rotation angle $\beta$ causes a deviation in the cycle number i. Hereafter, the deviation amount of the cycle number i will be referred to as mod_i. The deviation amount mod_i corresponds to a fraction (after decimal point) of a result of a calculation of the cycle number i, which is an integer. The deviation amount mod_i is expressed as the deviation from a true value of the cycle number i (actual cycle number of first magnetic sensor 18) calculated from equation (5).

Figure 4:
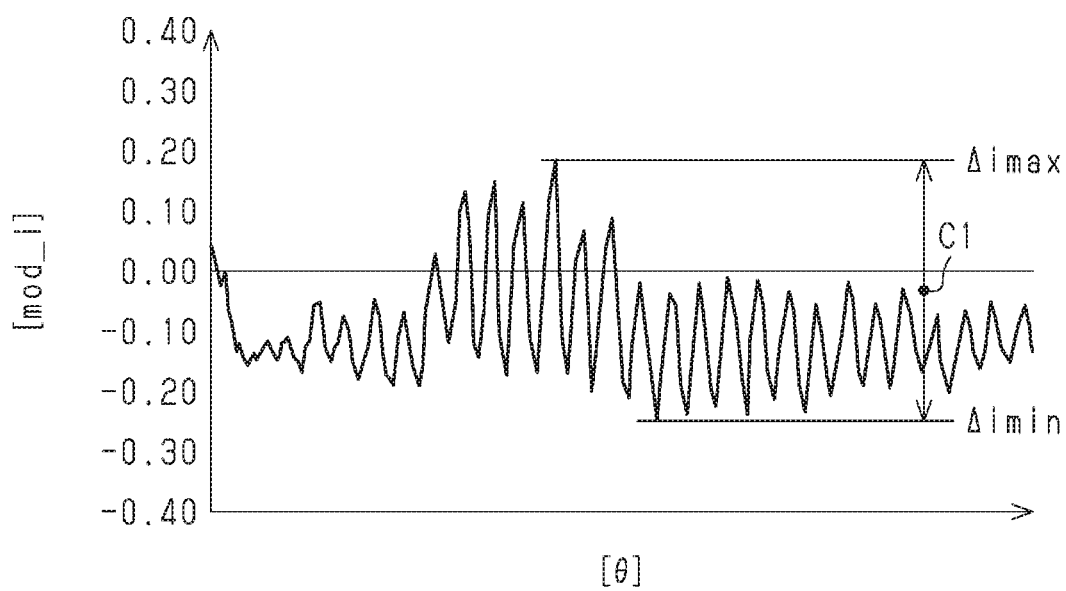
FIG. 4 is a graph illustrating an error in rotation information of a driven gear.

As illustrated in FIG. 4, the deviation amount mod_i fluctuates in accordance with changes in the absolute rotation angle $\theta$. This is because the deviation amount mod_i results from the error of the rotation angle $\alpha$ and the rotation angle $\beta$ that irregularly varies toward the positive side or the negative side in accordance with changes in the absolute rotation angle $\theta$ of the driving gear 13.

The deviation amount mod_i will now be described with reference to one example in which "$\alpha-\beta\geq 0$" is satisfied. When "$\alpha-\beta\geq 0$" is satisfied, equation (5) is expanded as in the following equation (6).

$$i=(m\alpha-L\beta)/\{(L-m)\Omega\} \quad (6)$$

According to equation (6), for example, when the rotation angle $\alpha$ includes an error toward the positive side and the rotation angle β includes an error toward the negative side, in other words, when the error increases "α−β", the deviation amount mod_i occurs in the positive side. In contrast, for example, when the rotation angle α includes an error in the negative side and the rotation angle β includes an error in the positive side, in other words, when the error decreases "α−β", the deviation amount mod_i occurs in the negative side. In this manner, the deviation amount mod_i fluctuates relative to the absolute rotation angle θ so that deviation width from the true value changes in accordance with the combination of the errors in the rotation angle α and the rotation angle β. The deviation amount mod_i is expressed by the following equation (7).

$$\text{mod\_}i = (m\Delta\alpha - L\Delta\beta)/\{(L-m)\Omega\} \qquad (7)$$

Here, $\Delta\alpha$ is an error of the rotation angle α and $\Delta\beta$ is an error of the rotation angle β. Equation (7) is also satisfied when "α−β<0" is satisfied.

When calculating the absolute rotation angle θ of the driving gear 13, if the cycle number i includes the deviation amount mod_i, the absolute rotation angle θ may be affected by the deviation amount mod_i. Thus, the angle calculator 21 rounds the fraction of the cycle number i when calculating the absolute rotation angle θ. In the present example, the angle calculator 21 rounds the fraction of the cycle number i after the decimal point.

However, when the cycle number i is rounded, the rounded value of the cycle number i may differ from the true value. For example, when rounding the fraction of the cycle number i after the decimal point, if the deviation amount mod_i is greater than or equal to 0.5 or less than or equal to −0.5, the cycle number i differs from the true value. For example, when the deviation amount mod_i is greater than or equal to 0.5 and less than 1.0, the cycle number i is rounded up to the value greater than the true value by 1. Further, when the deviation amount mod_i is greater than −1.0 and less than or equal to −0.5, the cycle number i is rounded down to the value less than the true value by 1. Thus, the deviation amount mod_i should be included in a specified range so that the deviation mod_ is not an erroneous value resulting from the rounding. In the present example, the specified range of the deviation amount mod_i is greater than −0.5 and less than 0.5.

Correction of Zero Point Correction Value

With reference to FIG. 1, the initialization device 22 in the present example includes a correction unit 24. The correction unit 24 measures the deviation amount mod_i and corrects the second correction value B based on the measured the deviation amount mod_i so that the deviation amount mod_i is included in the specified range.

A correction process of the second correction value B will now be described. When the first correction value A and the second correction value B are set by the zero point adjustment unit 23, the relationship is ideal between the absolute rotation angle θ of the driving gear 13 and the output of the first magnetic sensor 18 and the second magnetic sensor 19 (rotation angle α and rotation angle β). Thus, the microcomputer 20 pre-stores the true value of the cycle number i relative to the absolute rotation angle θ based on this ideal relationship.

The correction unit 24 measures the deviation amount mod_i by comparing the cycle number i relative to the absolute rotation angle θ calculated when the driving gear 13 is actually rotated with its true value. This measurement may be performed automatically by the microcomputer 20 or be performed manually by a person carrying out a predetermined operation. Subsequently, the correction unit 24 obtains a center deviation amount C1 from an average value of a maximum value and a maximum value of the measured deviation amount mod_i. Here, a contribution ratio of the error $\Delta\alpha$ relative to the center deviation amount C1 and a contribution ratio of the error $\Delta\beta$ relative to the center deviation amount C1 are unknown. Thus, in the present example, the error $\Delta\alpha$ is set to zero when the correction unit 24 corrects the error $\Delta\beta$, which is not directly related to the calculation of the absolute rotation angle θ, that is, the correction unit 24 corrects the second correction value B. The center deviation amount C1 is expressed by the following equation (8).

$$C1 = (\Delta i\,\text{max} + \Delta i\,\text{min})/2 \qquad (8)$$

Here, $\Delta i$max is the maximum value of the deviation amount mod_i and $\Delta i$min is the minimum value of the deviation amount mod_i.

The correction unit 24 corrects the second correction value B so that the center deviation amount C1 is zero. In the present example, the error $\Delta\alpha$ of the rotation angle α is set to zero when the error $\Delta\beta$ of the rotation angle β is corrected. The following equation (9) is obtained when "$\Delta\alpha=0$" is substituted into equation (7).

$$\text{mod\_}i = -L\Delta\beta/\{(L-m)\Omega\} \qquad (9)$$

The center deviation amount C1 is zero when the deviation amount mod_i is offset by −C1. According to equation (9), an offset amount C of the second correction value B for offsetting the deviation amount mod_i by −C1 is expressed by the following equation (10).

$$C = C1(L-m)\Omega/L \qquad (10)$$

Then, the correction unit 24 sets a value obtained by adding the offset amount C to the second correction value B as a new second correction value B'.

Initialization Method

A method for initializing the rotation angle detection device 10 will now be described with reference to FIGS. 5 and 6. The initialization method in the present example is performed during an initial assembling stage of the rotation angle detection device 10.

Figure 5:
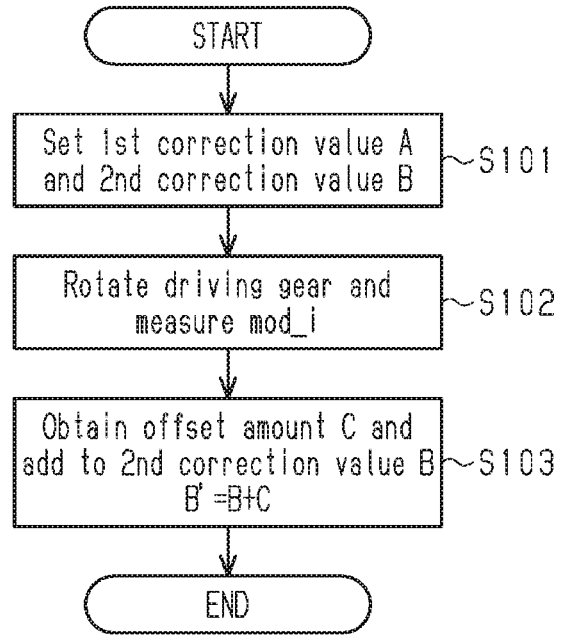
FIG. 5 is a flowchart of an initialization method.

As illustrated in FIG. 5, in step S101, the initialization device 22 adjusts the zero point with the zero point adjustment unit 23. Step S101 corresponds to a zero point adjustment step. In the present example, the zero point adjustment unit 23 sets arbitrary rotation positions as the rotation references for the first driven gear 14 and the second driven gear 15 and sets the first correction value A and the second correction value B so that the rotation references coincide with the output references of the first magnetic sensor 18 and the second magnetic sensor 19.

In step S102, the initialization device 22 measures the deviation amount mod_i with the correction unit 24 when the driving gear 13 is actually rotated. Step S102 corresponds to a measurement step. The deviation amount mod_i is measured over the rotation detection range of the driving gear 13 in the rotation angle detection device 10.

In step S103, the initialization device 22 corrects the second correction value B with the correction unit 24. Step S103 corresponds to a correction step. The correction unit 24 obtains the offset amount C with which the calculated center deviation amount C1 will be zero based on the deviation amount mod_i measured in step S102. Subsequently, the correction unit 24 adds the offset amount C to the second correction value B to set a new second correction value B'. That is, the correction unit 24 offsets the deviation amount mod_i by correcting the output of the second magnetic sensor 19 through the correction of the second correction value B'.

Figure 6:
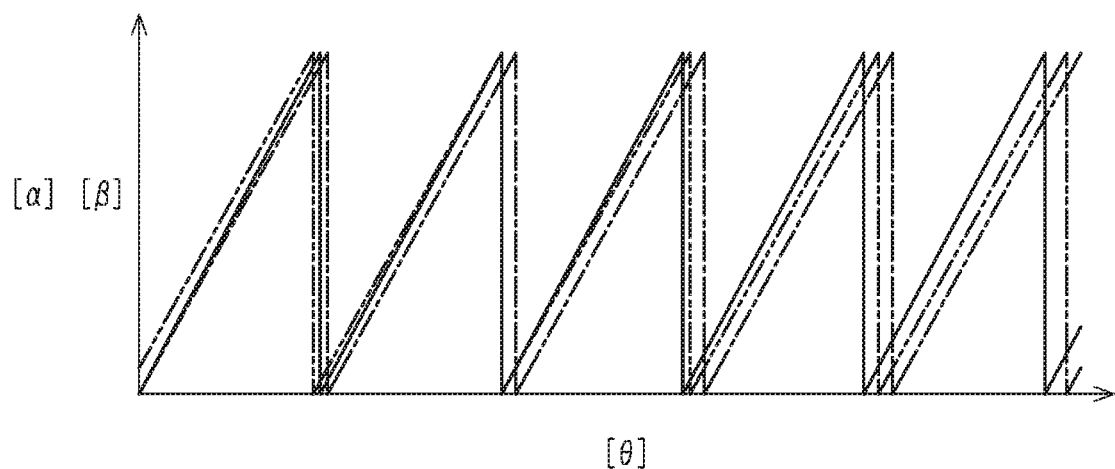
FIG. 6 is a graph illustrating output of a sensor after correction.

As illustrated in FIG. 6, the rotation angle β corrected with the second correction value B' illustrated by the double-dashed lines in FIG. 6 is obtained by correcting the rotation angle β, which is corrected with the second correction value B illustrated by the dashed lines, with the offset amount C. This offsets the deviation amount mod_i by −C1. That is, the center deviation amount C1 detected in the measurement step is zero.

If the center deviation amount C1 is located toward the positive side, the maximum value Δimax of the deviation amount mod_i is likely to be greater than or equal to 0.5. Further, if the center deviation amount C1 is located toward the negative side, the minimum value Δimin of the deviation amount mod_i is likely to be less than or equal to −0.5. With the initialization method of the present example, the center deviation amount C1 is offset to zero so that the deviation amount mod_i is easily included in the range of which the center is zero. Accordingly, the deviation amount mod_i is easily included in the specified range greater than −0.5 and less than 0.5. Thus, the cycle number i is not likely to be an erroneous value even when rounded.

The absolute rotation angle θ of the steering shaft 11 is obtained from the rotation angle α of the first driven gear 14 and the cycle number i of the first driven gear 14 (refer to equation (3)). In step S103, only the second correction value B that corrects the rotation angle β is corrected when offsetting the deviation amount mod_i. That is, the rotation angle α that directly affects the calculation of the absolute rotation angle θ is not corrected. Thus, the correction for offsetting the deviation amount mod_i will not lower the detection accuracy of the absolute rotation angle θ. Further, the cycle number i is not likely to be an erroneous value since the deviation amount mod_i is offset. This improves the detection accuracy of the absolute rotation angle θ.

The present embodiment has the advantages described below.

(1) In the present example, the output of the second magnetic sensor 19 is corrected through the initialization method including the zero point adjustment step, the measurement step, and the correction step so that the deviation amount mod_i resulting from the calculation of the cycle number i is included in the specified range. With this configuration, the second correction value B set in the zero point adjustment step is corrected to a preferred value based on the deviation amount mod_i obtained in the measurement step. In this manner, even if the first driven gear 14 and the second driven gear 15 include dimension variations or coupling variations, the zero points of the output of the magnetic sensors 18 and 19 are corrected. Thus, the rotation angle detection device 10 allows for the detection of the rotation angle θ with high accuracy.

(2) In the present example, the rotation angle detection device 10 calculates the cycle number i based on the rotation angle α and the rotation angle β and obtains the absolute rotation angle θ of the steering shaft 11 based on the cycle number i and the rotation angle α. With this configuration, the cycle number i is a preferred value obtained from the rotation angle β after the zero point is corrected. Accordingly, the rotation angle detection device 10 allows for calculation of the absolute rotation angle θ from the preferred cycle number i. Thus, the rotation angle detection device 10 allows for the detection of the rotation angle θ with high accuracy.

(3) In the present example, the second correction value B is corrected in the correction step. With this configuration, the second correction value B of the output of the second magnetic sensor 19 that is not directly related to the calculation of the steering shaft 11 is corrected in addition to the deviation of the output of the first magnetic sensor 18. Thus, the rotation angle detection device 10 allows for the detection of the rotation angle θ with high accuracy.

(4) In the present example, the cycle number i is a value obtained by rounding a fraction. In the correction step, the second correction value B is corrected so that the center deviation amount C1, which is the average value of the maximum value Δimax and the minimum value Δimin of the deviation amount mod_i, is zero. With this configuration, the cycle number i of the deviation amount mod_i is easily included in the range of which the center is zero. Accordingly, when the cycle number i is obtained by rounding the fraction, which serves as the deviation amount mod_i, the cycle number i will not be affected by the rounding. Thus, the cycle number i will not be an erroneous value.

The above embodiment may be modified as described below. The above embodiment and the following modifications may be combined as long as the combined modifications remain technically consistent with each other.

In the above embodiment, the process for rounding the fraction of the cycle number i or the specified range of the deviation amount mod_i may be changed. For example, the fraction may be rounded up or down to the nearest integer. When the fraction is rounded up to the nearest integer, the specified ranged of the deviation amount mod_i is greater than −1.0 and less than or equal to 0. Further, when the fraction is rounded down to the nearest integer, the specified range of the deviation amount mod_i is greater than or equal to 0 and less than 1.0. In this manner, the specified range of the deviation amount mod_i is changed depending on the rounding process.

In the above embodiment, the detection process of the absolute rotation angle θ in the measurement step is not particularly limited. For example, the absolute rotation angle θ may be detected with a measurement device other than the rotation angle detection device 10 and input to the microcomputer 20. Furthermore, for example, the driving gear 13 may be rotated at a predetermined angular velocity, and the correction unit 24 may detect the absolute rotation angle θ based on the time after the driving gear 13 starts rotating. In this way, the detection process of the absolute rotation angle θ in the measurement step may be changed.

In the above embodiment, the center deviation amount C1 is corrected to zero in the correction step. However, the correction process is not particularly limited. That is, as long as the deviation amount mod_i is included in the specified range, the center deviation amount C1 may be corrected to a value near zero.

In the above embodiment, the deviation amount mod_i does not have to correspond with the fraction after the decimal point of the cycle number i. As long as the deviation amount mod_i corresponds to the ideal cycle number i, various parameters may be applied as the deviation amount mod_i.

In the above embodiment, the rotation information is not limited to the cycle number i as long as the rotation information is a parameter related to the gear rotation.

In the above embodiment, the first sensor and the second sensor do not have to be a MR sensor. For example, the first sensor and the second sensor may be a magnetic sensor or an optical sensor.

In the above embodiment, the detection ranges Ω of the first magnetic sensor 18 and the second magnetic sensor 19 change depending on the characteristics of the sensor.

In the above embodiment, the adjustment and correction of the zero point do not have to be performed just once during an initial assembling stage of the rotation angle detection device 10. For example, the adjustment and correction of the zero point may be performed at a predetermined timing when the vehicle is in use after the assembly.

In the above embodiment, the teeth numbers m, L, and z of the gears may be changed. In this case, the following relationships should be satisfied between the gears. That is, the gears are arranged so that relational expressions "z>m, L" and "m≠L" are satisfied. In this case, the driven gear with a smaller number of teeth corresponds to the first driven gear of the present example.

In the above embodiment, the gears may be engaged in any manner. For example, the driving gear 13 may engage the first driven gear 14 and the second driven gear 15.

In the above embodiment, the rotation angle detection device 10 does not have to be a steering angle sensor that detects the rotation angle of a steering wheel. The present description may be applied to a rotation detection device that detects rotation of any rotary body.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for initializing a rotation angle detection device, wherein the rotation angle detection device includes a driving gear rotated integrally with a rotary body, a first driven gear and a second driven gear coupled to the driving gear and rotated in cooperation with the driving gear, a first sensor that detects rotation of the first driven gear and generates a first sensor output, and a second sensor that detects rotation of the second driven gear and generates a second sensor output, and the rotation angle detection device calculates a rotation angle of the rotary body based on the first sensor output and the second sensor output, the method comprising:
   adjusting a zero point of the first sensor output so that a rotation reference of the first driven gear coincides with a reference of the first sensor output;
   adjusting a zero point of the second sensor output so that a rotation reference of the second driven gear coincides with a reference of the second sensor output;
   calculating a cycle number of at least one of the first driven gear and the second driven gear based on the first sensor output and the second sensor output;
   measuring a deviation amount occurring in the calculation of the cycle number; and
   correcting the zero point of at least one of the first sensor output and the second sensor output to offset the deviation amount so that the deviation amount is included in a specified range.

2. The method according to claim 1, wherein the rotation angle detection device calculates the cycle number based on the first sensor output and the second sensor output and calculates the rotation angle of the rotary body based on the cycle number and at least one of the first sensor output and the second sensor output.

3. The method according to claim 1, wherein:
   the adjusting a zero point of the first sensor output includes
      setting a deviation of the rotation reference of the first driven gear from the reference of the first sensor output as a first zero point correction value, and
      adjusting the zero point of the first sensor output based on the first zero point correction value;
   the adjusting a zero point of the second sensor output includes
      setting a deviation of the rotation reference of the second driven gear from the reference of the second sensor output as a second zero point correction value, and
      adjusting the zero point of the second sensor output based on the second zero point correction value; and
   the correcting the zero point includes
      calculating an offset amount to include the deviation amount in the specified range when the rotation angle of the rotary body is calculated based on the first sensor output and the cycle number of the first sensor, and
      calculating a new zero point correction value by correcting the second zero point correction value based on the offset amount.

4. The initialization method according to claim 1, wherein:
   the cycle number is a value obtained by rounding a fraction of the cycle number after decimal point; and
   the correcting the zero point includes
      calculating a center deviation amount from an average value of a maximum value and a minimum value of the deviation amount, and
      offsetting the deviation amount so that the center deviation amount is zero or near zero.

5. An initialization device for a rotation angle detection device, wherein the rotation angle detection device includes a driving gear rotated integrally with a rotary body, a first driven gear and a second driven gear coupled to the driving gear and rotated in cooperation with the driving gear, a first sensor that detects rotation of the first driven gear and generates a first sensor output, and a second sensor that detects rotation of the second driven gear and generates a second sensor output, and the rotation angle detection device calculates a rotation angle of the rotary body based on the first sensor output and the second sensor output, the initialization device comprising:
   a zero point adjustment unit that adjusts a zero point of the first sensor output so that a rotation reference of the first driven gear coincides with a reference of the first sensor output and adjusts a zero point of the second sensor output so that a rotation reference of the second driven gear coincides with a reference of the second sensor output; and
   a correction unit that corrects the zero point of at least one of the first sensor output and the second sensor output;
   wherein the correction unit calculates a cycle number of at least one of the first driven gear and the second driven gear based on the first sensor output and the second sensor output, measures a deviation amount occurring in the calculation of the cycle number, and corrects the zero point of at least one of the first sensor output and the second sensor output to offset the deviation amount so that the deviation amount is included in a specified range.

\* \* \* \* \*